(12) United States Patent
Lowder et al.

(10) Patent No.: US 7,140,287 B2
(45) Date of Patent: *Nov. 28, 2006

(54) VARIABLE TOOTH SAW BLADE

(75) Inventors: Jeremy A. Lowder, Boone, NC (US); Scott A. Vilagi, Amherst, OH (US)

(73) Assignee: Black & Decker Inc., Towson, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/950,765

(22) Filed: Sep. 27, 2004

(65) Prior Publication Data

US 2005/0051018 A1 Mar. 10, 2005

Related U.S. Application Data

(62) Division of application No. 10/391,425, filed on Mar. 18, 2003, now Pat. No. 7,013,784.

(60) Provisional application No. 60/365,999, filed on Mar. 19, 2002.

(51) Int. Cl.
*B27B 33/08* (2006.01)
*B23D 61/02* (2006.01)

(52) U.S. Cl. ............................. 83/848; 83/676; 83/855

(58) Field of Classification Search ................... 83/676, 83/835, 836, 839, 846–855, 661
See application file for complete search history.

(56) References Cited

U.S. PATENT DOCUMENTS

| | | | |
|---|---|---|---|
| 156,748 A | 11/1874 | Andrews | |
| 245,090 A | 8/1881 | Northway | |
| 352,867 A | 11/1886 | Greist | |
| 514,207 A | 2/1894 | Bott | |
| 1,167,801 A | 1/1916 | De Laney | |
| 1,334,941 A | 3/1920 | Blake | |
| 4,766,794 A | 8/1988 | Blake | |
| 5,038,653 A | 8/1991 | Slocum et al. | |
| 5,361,665 A | 11/1994 | Sonefors | |
| 6,276,249 B1 * | 8/2001 | Handschuh et al. | 83/851 |
| 7,013,784 B1 * | 3/2006 | Lowder et al. | 83/848 |

* cited by examiner

*Primary Examiner*—Clark F. Dexter
(74) *Attorney, Agent, or Firm*—Sand & Sebolt

(57) ABSTRACT

An apparatus for cutting materials and more specifically an improved saw blade includes a plurality of variable teeth thereon. The variable tooth saw blade cuts faster and smoother while reducing harmonic vibrations. Specifically, the teeth on the saw blade are grouped into sections with differing circumferential widths and differing spacing between the sections.

34 Claims, 4 Drawing Sheets

VARIABLE TOOTH SAW BLADE

CROSS REFERENCE TO RELATED APPLICATIONS

This application is a divisional application of U.S. patent application Ser. No. 10/391,425 filed Mar. 18, 2003 now U.S. Pat. No. 7,013,784, which claims priority from U.S. Provisional application Ser. No. 60/365,999 filed Mar. 19, 2002; the disclosures of which are incorporated herein by reference.

BACKGROUND OF THE INVENTION

1. Technical Field

This invention relates to rotary saw blades, and more particularly circular saw blades for use on circular saws or the like. Specifically, the invention is directed to a variable tooth saw blade that cuts faster and smoother while reducing harmonic vibrations.

2. Background Information

Circular saw blades are readily available for use in cutting wood and other materials using a portable, hand-held circular saw, or a fixed table or radial saws, or other like saws. The saw blades are formed of flat, circular discs made of steel or other like metals. As is well known in the art, circular saw blades include a peripheral edge from which a plurality of circumferentially-spaced teeth project radially outwardly for cutting.

Users continually desire to purchase blades that allow for faster cutting without negative effects such as "burning" of the blade, dulling of the teeth, or jamming of the saw. The ability of the teeth to efficiently cut the material and thus maintain the blade speed is critical. As a result, users continue to desire improved blades providing for faster and/or more efficient cutting.

Users also desire smooth cuts. Often the speed of a cut is inversely correlated to the smoothness of the cut, that is, the faster the user cuts, the rougher is the end cut, and vice versa. As a result, users continue to desire improved smoothness coupled with faster cutting.

Users further desire reduced noise. The high speed at which blades rotate often causes high levels of harmonic vibration leading to excessive noise, undesirable saw or saw blade vibration, and if the vibration is significant, a less than desirable cut. Users thus desire, and often government agencies require, blades providing for reduced noise and thus reduced harmonic vibration.

Consequently, there is a need for an improved saw that cuts faster and smoother while also reducing noise and harmonic vibration.

SUMMARY OF THE INVENTION

The present invention provides a saw blade comprising a flat, circular disc having a peripheral outer edge and a center hole; a plurality of circumferentially-spaced teeth each having a cutting edge and projecting radially outwardly from the peripheral outer edge; a first group of the cutting edges defining a first circumferential width between each adjacent pair of the cutting edges in the first group; a second group of the cutting edges defining a second circumferential width between each adjacent pair of the cutting edges in the second group; the second circumferential width differing from the first circumferential width; and a third group having at least one cutting edge defining a third circumferential width as one of the distance between adjacent cutting edges in the third group and, the distance between the at least one cutting edge in the third group and the adjacent cutting edge in the adjacent group; the third circumferential width differing from the first and second circumferential widths.

The invention further provides a saw blade comprising a flat, circular disc having a peripheral outer edge and a center hole, the disc being divided into a first half and a second half, each half being a copy exact of the other half positioned in a diametrically opposite manner; a plurality of circumferentially-spaced teeth each having a cutting edge and projecting radially outwardly from the peripheral outer edge; a first group in each half having five cutting edges including a first cutting edge and a last cutting edge defining therebetween a first group circumferential width of approximately sixty degrees; a second group in each half having three cutting edges including a first cutting edge and a last cutting edge defining therebetween a second group circumferential width of approximately forty degrees; a third group in each half having one cutting edge and having a third group circumferential width defined between the one cutting edge of the third group and the last cutting edge of the second group, the third group circumferential width being approximately thirty-six degrees; a first circumferential space being between the first and second groups in each half and having an approximately twenty-degree circumferential width; and a second circumferential space being between the third group in each half and the first group in the respective other half and having an approximately twenty-four-degree circumferential width.

The invention further provides a saw blade comprising a flat, circular disc having a peripheral outer edge and a center hole, the disc being divided into a first half and a second half, each half being a copy exact of the other half positioned in a diametrically opposite manner; a plurality of circumferentially-spaced teeth each having a cutting edge and projecting radially outwardly from the peripheral outer edge; a first group in each half having seven cutting edges including a first cutting edge and a last cutting edge defining a first group circumferential width therebetween which is approximately thirty-six degrees; a second group in each half having six cutting edges including a first cutting edge and a last cutting edge defining a second group circumferential width therebetween which is approximately forty-five degrees; a third group in each half having three cutting edges including a first cutting edge and a last cutting edge defining a second group circumferential width therebetween which is approximately thirty degrees; a fourth group in each half having two cutting edges defining a second group circumferential width therebetween which is approximately twenty degrees; a first circumferential space being between the first and second groups in each half and having an approximately nine-degree circumferential width; a second circumferential space being between the second and third groups in each half and having an approximately ten-degree circumferential width; a third circumferential space being between the third and fourth groups in each half and having an approximately ten-degree circumferential width; and a fourth circumferential space being between the fourth group in each half and the first group in the respective other half and having an approximately twenty-degree circumferential width.

BRIEF DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

Figure 1:
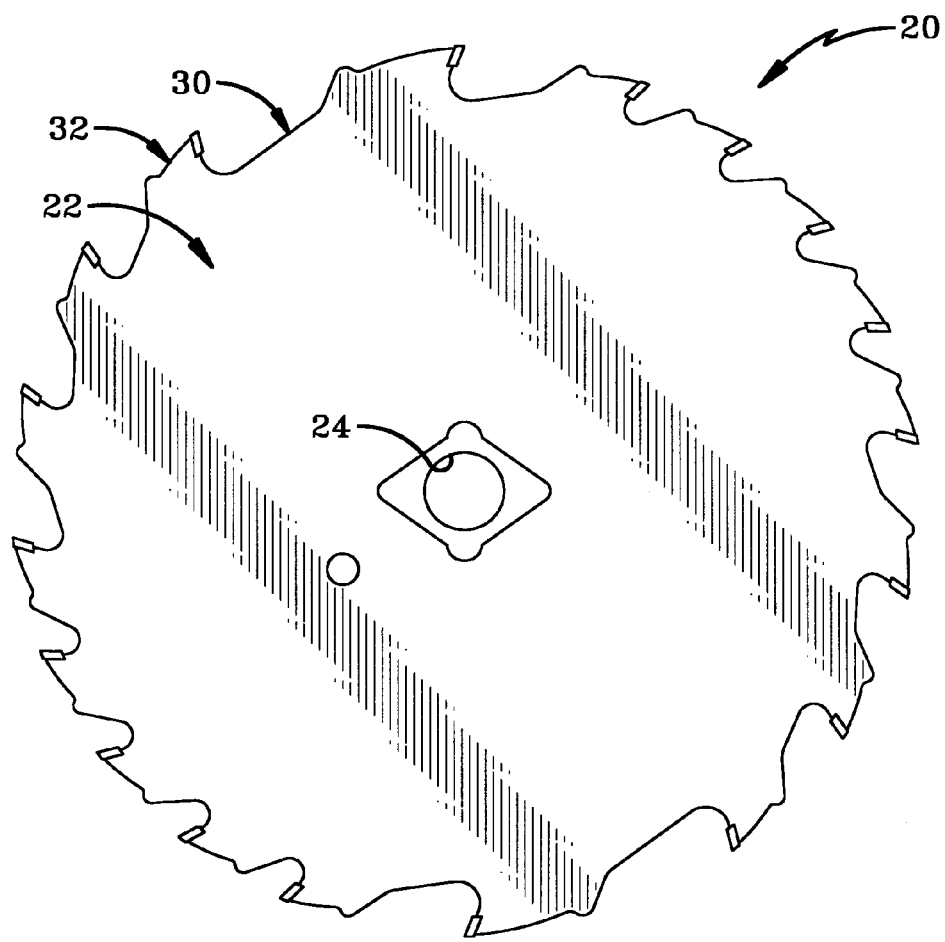
FIG. 1 is a side view of a first embodiment of the saw blade of the present invention.
Figure 2:
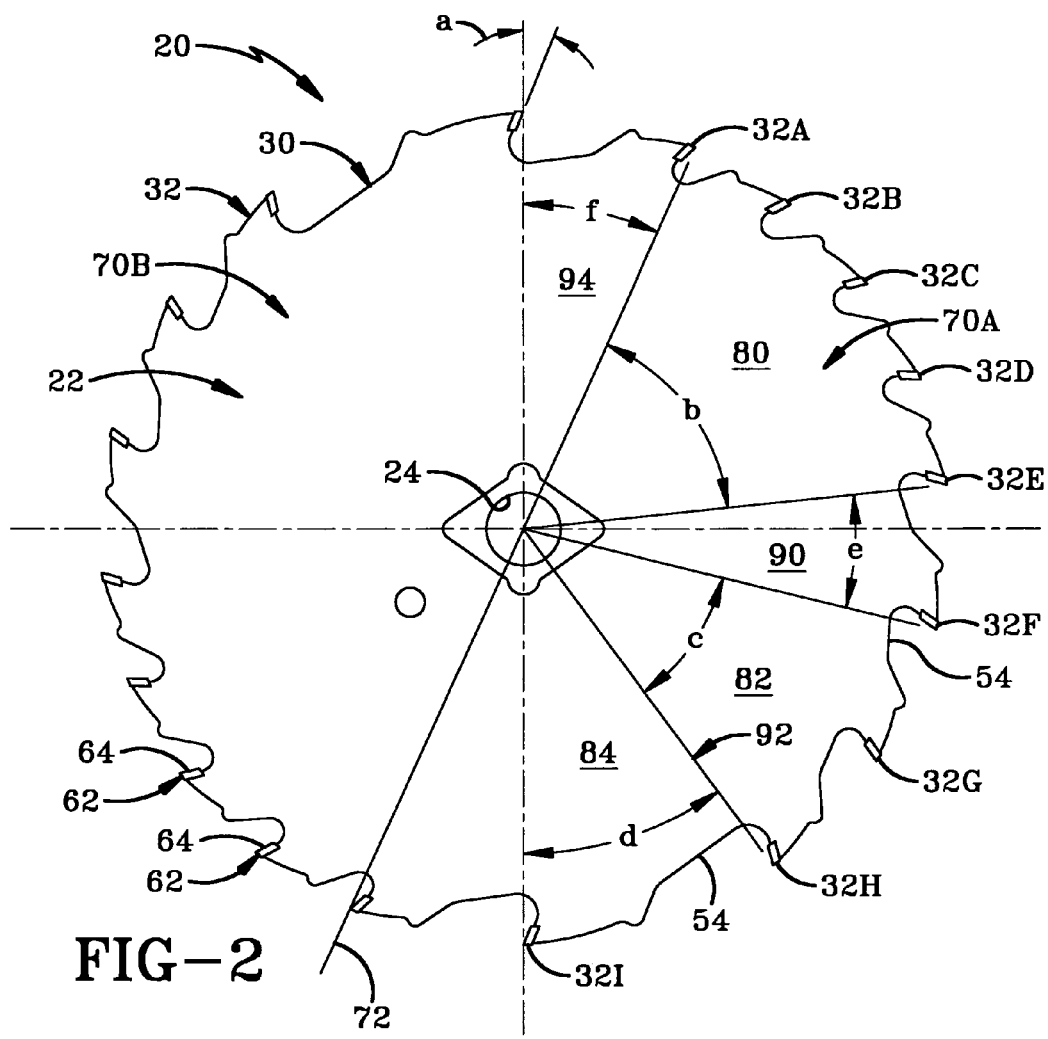
FIG. 2 is the same side view of the first embodiment of the saw blade as in FIG. 1 with the sections clearly marked.
Figure 3:
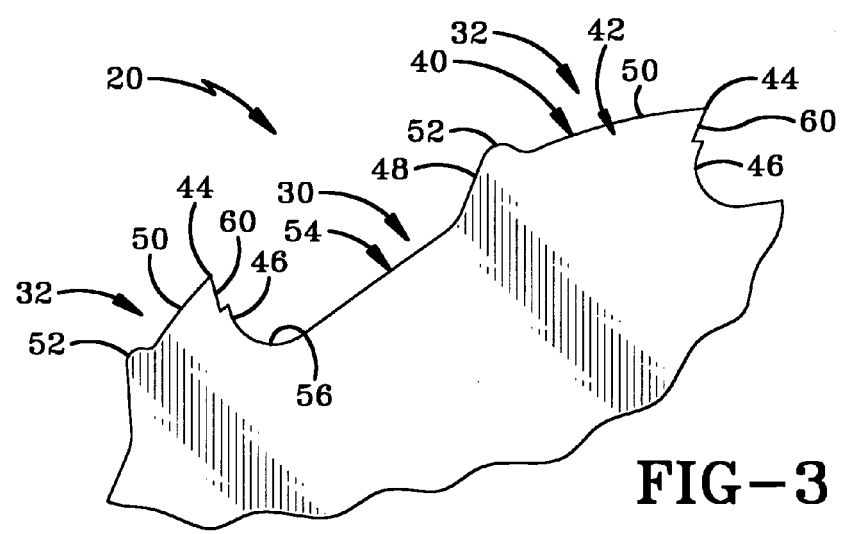
FIG. 3 is an enlarged view of a few teeth from the saw blade of the first embodiment in FIGS. 1–2.
Figure 4:
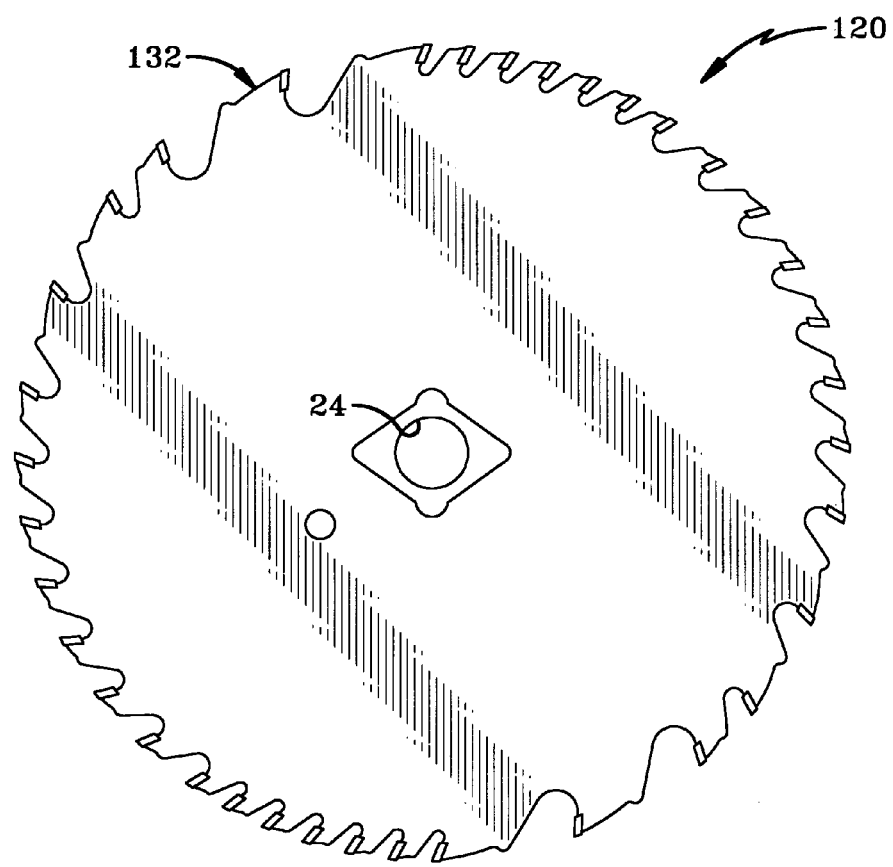
FIG. 4 is a side view of a second embodiment of the saw blade of the present invention.
Figure 5:
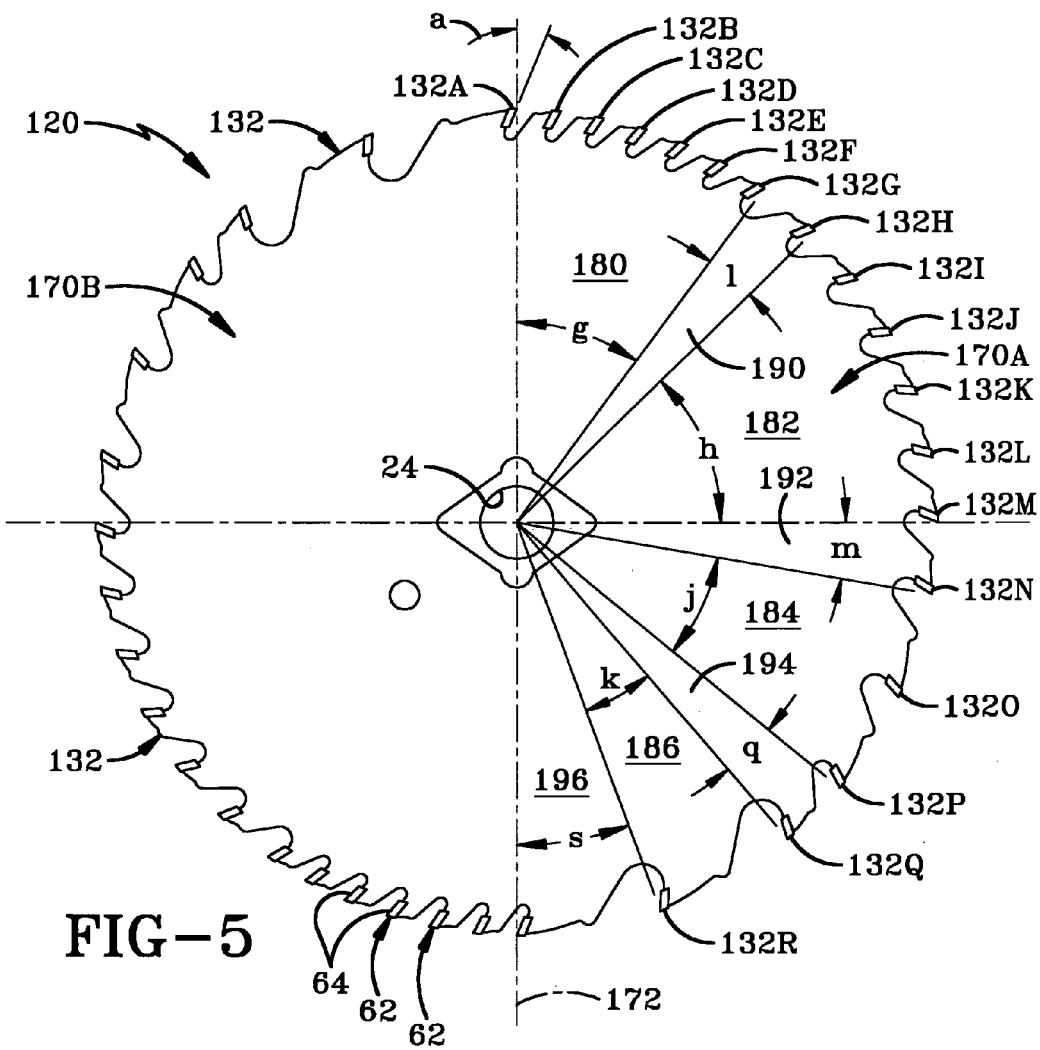
FIG. 5 is the same side view of the second embodiment of the saw blade as in FIG. 4 with the sections clearly marked.
Figure 6:
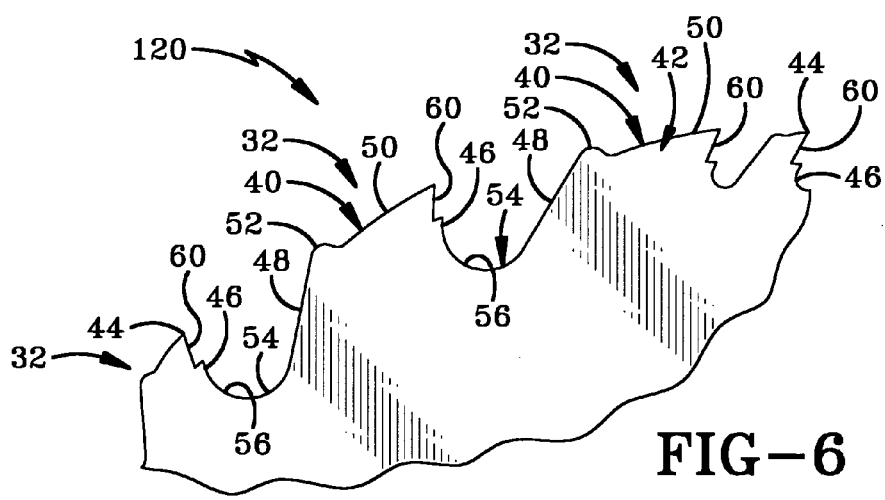
FIG. 6 is an enlarged view of a few teeth from the saw blade of the second embodiment in FIGS. 4–5.

The improved saw blade of the present invention is shown in two embodiments in the Figures although other embodiments are contemplated as is apparent to one of skill in the art. Specifically, the first embodiment of the improved saw blade is indicated generally at 20 as shown in FIGS. 1–2, while a second embodiment of the improved saw blade is indicated generally at 120 as shown in FIGS. 4–5.

The first embodiment is saw blade 20 embodied as a standard seven and one quarter inch diameter saw blade although it may be of any other diameter used or contemplated by those of skill in the art. The saw blade whether embodied as blade 20 or 120 is a flat, circular disc 22, made of steel or other like metals, with a center arbor hole 24 as is well known in the art. The disc 22 includes a peripheral edge 30 with a plurality of circumferentially-spaced teeth projecting radially outwardly therefrom for cutting and generally referred to as 32. Each tooth 32 has a cutting edge 44 and is more fully described below.

In accordance with one of the features of the invention, the blade is divided into an even number of groups or sections, and in more detail the blade 20 in the first embodiment is divided into two halves of six sections while the blade 120 in the second embodiment is divided into two halves of eight sections. Each section along the peripheral edge has a matching or copy exact section diametrically opposite thereto such that a symmetry-like line divides the blade into two halves of a repeating pattern.

In further accordance with one of the features of the invention, the sections in each half do not have the same number of teeth or teeth of the same size as the other sections. More particularly, there are a different number of cutting edges 44 in each section in each half and the circumferential width between each of the adjacent cutting edges 44 within a given section is different than that of each other section in a given half.

Preferably in accordance with another feature of the invention, the size of the teeth remains the same and/or decreases in each section from a largest size to a smallest size in the direction of cutting (or vice versa), while the number of teeth increases or remains the same in each section in the direction of cutting (or vice versa respectively). More particularly, the circumferential width between each adjacent pair of cutting edges 44 remains the same and/or decreases in each section from largest to smallest in the direction of cutting (or vice versa), while the number of cutting edges 44 increases or remains the same in each section in the direction of cutting (or vice versa respectively).

Each tooth 32 includes a tooth body 40 defined as a sloped face or land 42 culminating in outwardly extending cutting edge 44. On the opposite side of cutting edge 44 from land 42 is a notch or void 54 which communicates with the land 42 of an adjacent tooth 32. Notch 54 thus separates the cutting edge 44 of one tooth 32 from the land 42 of an adjacent tooth 32. More specifically, notch 54 includes a radial face 46 extending inwardly toward hole 24 adjacent cutting edge 44 of one tooth 32 into a bend 56 which communicates with land 42 of an adjacent tooth 32. Land 42 may include an optional additional cutting or finishing edge 52 in the middle thereof for reducing kick-back and providing smoother cuts, whereby such land 42 in the embodiment shown includes a first steep tapered section 48 and a second slightly tapered section 50 separated by the additional cutting edge 52 although other configurations are contemplated including only one tapered section of a constant taper or a gradually changing taper. Specifically, land 42 may be any form of a surface behind tooth 32 that transitions into notch 54. Cutting edge 44 may be a sharpened edge, or, as in the embodiments, an L-shaped seat 60 in which an insert such as a carbide or diamond tip 62 is seated and secured. The insert has a cutting face 64. Where an insert is used, cutting edge 64 becomes the cutting edge of a tooth 32 and thus the term "cutting edge" includes "cutting face" in that scenario.

In accordance with yet another feature of the invention, the hook angle a of each tooth is most preferably between 15° (fifteen degrees) and 25° (twenty-five degrees). The hook angle a is specifically the angle between the tangent to the cutting face 44 and a radius line through hole 24.

In more detail as to the first embodiment of the blade referred to as 20, teeth 32 are arranged in a unique eighteen-tooth design that is divided into two copy exact sections, namely a first side 70A and a second side 70B divided by axis 72. Since the blade as shown in FIGS. 1–2 has a right and left copy exact side (sides 70A and 70B respectively), only the right side will be described below (except where necessary to refer to the other or left side where transitions occur). The first side 70A includes nine teeth, namely teeth 32A, 32B, 32C, 32D, 32E, 32F, 32G, 32H, and 32I separated by voids 54.

In accordance with another feature of the invention, the nine teeth 32A, 32B, 32C, 32D, 32E, 32F, 32G, 32H, and 32I of each side 70A and 70B are not all identical in size and spacing. Specifically in the embodiment shown, first side 70A is divided into three sections 80, 82 and 84 (and thus the saw blade 20 has six sections over sides 70A and 70B) of varying circumferential distance with differing number of teeth and size of teeth in each.

Section 80 includes cutting edges 44 of five teeth 32, namely teeth 32A, 32B, 32C, 32D, and 32E, and these cutting edges define a first circumferential width between each adjacent pair of the cutting edges. Section 80 also includes the trailing components of four teeth 32, namely teeth 32B, 32C, 32D, and 32E, so that those four teeth are fully within section 80, and those teeth within section 80 are substantially identical to one another. These trailing components include land 42 having tapered sections 48 and 50, and optional additional cutting edge 52. Thereafter, section 82 includes cutting edges 44 of three teeth, namely teeth 32F, 32G and 32H, and these cutting edges define a second circumferential width between each adjacent pair of the cutting edges that is different from the first circumferential width. Section 82 also includes the trailing components of two teeth, namely teeth 32G and 32H, so that those two teeth are fully within section 82, and those teeth within section 82 are substantially identical to one another. Further thereafter, section 84 includes cutting edge 44 of one tooth, namely tooth 32I, along with its trailing components, so that tooth 32I is fully within section 84.

Each of sections 80, 82 and 84 is specifically measured as the circumferential group width from the cutting edge 44 of the first tooth 32 of a section to the cutting edge 44 of the last tooth in the same section except where a section has only one tooth 32 and thus its circumferential group width is defined from the cutting edge 44 of the last tooth 32 of the previous section to the cutting edge 44 of the only tooth 32 in the section. Specifically, section 80 is the circumferential group width from the cutting edge 44 of the first tooth 32A of the section 80 to the cutting edge 44 of the last tooth 32E in the same section 80, which is defined as angle b. Section 82 is the circumferential group width from the cutting edge 44 of the first tooth 32F of the section 82 to the cutting edge 44 of the last tooth 32H in the same section 82, which is defined as angle c. Section 84 with only one tooth is the circumferential group width from the cutting edge 44 of the last tooth 32H of the previous section 82 to the only cutting edge 44 of the only tooth 32I in the section 84, which is defined as angle d. The previous section for the first section is the last section, which would mean the last section of the other side where the blade has two copy exact sides, or simply the last section in the case where the sections span the entire circumference of the blade. For example, the section previous to section 80 of side 70A is section 84 of side 70B.

In between each of the sections are transitions or circumferential spaces 90, 92, and 94. Specifically, transition 90 is the space between sections 80 and 82, transition 92 is the space between sections 82 and 84 but since the section 84 has only one tooth then no transition exists as section 84 and transition 92 have the same definition, and transition 94 is the space between sections 84 and 80 of the next side (the left side). This space is defined as the circumferential width from the cutting edge 44 of the last tooth of a section to the cutting edge 44 of the first tooth in the next section. Specifically, transition 90 is the circumferential width from the cutting edge 44 of the tooth 32E of section 80 to the cutting edge 44 of the tooth 32F in the next section 82, which is defined as angle e. Transition 92 does not exist due to the one-tooth nature of section 84. Transition 94 is the circumferential width from the cutting edge 44 of the tooth 32I of section 84 to the cutting edge 44 of the tooth 32A in the next section 80 (which is on the other side or left side in this case), which is defined as angle f.

In accordance with one of the features of the invention, the section angle b is 60°, the section angle c is 40°, the section angle d is 36°, the transition angle e is 20°, and the transition angle f is 24°. The effect is a design where section 80 has cutting edges 44 for five teeth, section 82 has cutting edges 44 for three teeth, and section 84 has cutting edges for one tooth, with uneven transitions between sections 80 and 82, and between 84 and 80 of the other side (the left side). Although it is noted above that no transition 92 exists between sections 82 and 84 because the definition of transition 92 is the same as section 84, nonetheless, it is also seen that what might be considered as transition 92 also differs from either of transitions 90 and 94.

In more detail as to the second embodiment of the blade referred to as 120, teeth 32 are arranged in a unique thirty-six tooth design that is divided into two copy exact sections, namely a first side 170A and a second side 170B by axis 172. Since the blade as shown in FIGS. 4–5 has a right and left copy exact side (sides 170A and 170B respectively), only the right side will be described below (except where necessary to refer to the left side). The first side 170A includes eighteen teeth, namely teeth 132A, 132B, 132C, 132D, 132E, 132F, 132G, 132H, 132I, 132J, 132K, 132L, 132M, 132N, 132O, 132P, 132Q, and 132R.

As with the first embodiment and in accordance with one of the features of the invention, the eighteen teeth 132A, 132B, 132C, 132D, 132E, 132F, 132G, 132H, 132I, 132J, 132K, 132L, 132M, 132N, 132O, 132P, 132Q, and 132R of each side 170A and 170B are not all identical in size and spacing. Specifically in the embodiment shown, first side 170A is divided into four sections 180, 182, 184 and 186 (and thus saw blade 120 has eight sections) of varying circumferential distance with differing number of teeth and size of teeth in each. Section 180 includes cutting edges 44 of seven teeth, namely teeth 132A, 132B, 132C, 132D, 132E, 132F, and 132G, and these cutting edges define a first circumferential width between each adjacent pair of the cutting edges; Section 180 also includes the trailing components of six teeth, namely teeth 132B, 132C, 132D, 132E, 132F and 132G, so that those six teeth are fully within section 180, and those teeth within section 180 are substantially identical to one another. As noted above, the trailing components include land 42 including tapered sections 48 and 50, and optional additional cutting edge 52. Thereafter, section 182 includes cutting edges 44 of six teeth, namely teeth 132H, 132I, 132J, 132K, 132L and 132M, and these cutting edges define a second circumferential width between each adjacent pair of the cutting edges that is different from the first circumferential width; Section 182 also includes the trailing components of five teeth, namely teeth 132I, 132J, 132K, 132L and 132M, so that those five teeth are fully within section 182, and those teeth within section 182 are substantially identical to one another. Further thereafter, section 184 includes cutting edges 44 of three teeth, namely teeth 132N, 132O and 132P, and these cutting edges define a third circumferential width between each adjacent pair of the cutting edges that is different from the first and second circumferential widths. Section 184 also includes the trailing components of two teeth, namely teeth 132O and 132P, so that those two teeth are fully within section 184, and those teeth within section 184 are substantially identical to one another. Finally thereafter, section 186 includes cutting edges 44 of two teeth, namely teeth 132Q and 132R, along with the trailing components of tooth 132R, so that tooth 132R is fully within section 186.

In the same manner as described above with reference to the first embodiment, each section is specifically measured as the group circumferential width from the cutting edge 44 of the first tooth of a section to the cutting edge 44 of the last tooth in the same section except where a section has only one tooth 132 and thus its group circumferential width is defined from the cutting edge 44 of the last tooth 132 of the previous section to the cutting edge 44 of the only tooth 132 in the section. Specifically, section 180 is the group circumferential width from the cutting edge 44 of the first tooth 132A of the section 180 to the cutting edge 44 of the last tooth 132G in the same section 180, which is defined as angle g. Section 182 is the group circumferential width from the cutting edge 44 of the first tooth 132H of the section 182 to the cutting edge 44 of the last tooth 132M in the same section 182, which is defined as angle h. Section 184 is the group circumferential width from the cutting edge 44 of the first tooth 132N of the section 184 to the cutting edge 44 of the last tooth 132P in the same section 184, which is defined as angle j. Section 186 is the group circumferential width from the cutting edge 44 of the first tooth 132Q of the section 186 to the cutting edge 44 of the last tooth 132R in the same section 186, which is defined as angle k.

In between each of the sections are transitions or circumferential spaces 190, 192, 194 and 196. Specifically, transition 190 is the space between sections 180 and 182, transition 192 is the space between sections 182 and 184, transition 194 is the space between sections 184 and 186, and transition 196 is the space between sections 186 and 180 of the next side (the left side). This space is defined as the circumferential width from the cutting edge 44 of the last tooth of a section to cutting edge 44 of the first tooth in the next section. Specifically, transition 190 is the circumferential width from cutting edge 44 of tooth 132G of section 180 to cutting edge 44 of tooth 132H in the next section 182, which is defined as angle l. Transition 192 is the circumferential width from cutting edge 44 of tooth 132M of section 182 to cutting edge 44 of tooth 132N in the next section 184, which is defined as angle m. Transition 194 is the circumferential width from cutting edge 44 of tooth 132P of section 184 to cutting edge 44 of tooth 132Q in the next section 186, which is defined as angle q. Transition 196 is the circumferential width from cutting edge 44 of tooth 132R of section 186 to cutting edge 44 of tooth 132A in the next section 180 (which is on the other side or left side in this case), which is defined as angle s.

In accordance with one of the features of the invention, the circumferential width or section angle g is 36.015°, the section angle h is 44.985°, the section angle j is 30.015°, the section angle k is 20°, the transition angle l is 9°, the transition angle m is 9.985°, the transition angle q is 10°, and the transition angle s is 20°.

In accordance with yet one more feature of the invention, it has been discovered that alternating the number of teeth in adjacent sections from odd to even provides additional benefits including noise reduction.

Accordingly, the improved saw blade of the above embodiments is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved saw blade is constructed and used, the characteristics of the construction, and the advantageous, new and useful results obtained; the new and useful structures, devices, elements, arrangements, parts and combinations, are set forth in the appended claims.

The invention claimed is:

1. A saw blade comprising:
a flat, circular disc having a peripheral outer edge and a center hole;
a plurality of circumferentially-spaced teeth each having a cutting edge and projecting radially outwardly from the peripheral outer edge;
a first group of the cutting edges defining a first circumferential width between each adjacent pair of the cutting edges in the first group;
a second group of the cutting edges defining a second circumferential width between each adjacent pair of the cutting edges in the second group; the second circumferential width differing from the first circumferential width;
a third group of the cutting edges defining a third circumferential width between each adjacent pair of the cutting edges in the third group; the third circumferential width differing from the first and second circumferential widths;
at least one of the first, second and third groups including at least three of the cutting edges; and
a fourth group having at least one cutting edge defining a fourth circumferential width as one of the distance between adjacent cutting edges in the fourth group and, the distance between the at least one cutting edge in the fourth group and the adjacent cutting edge in the adjacent group; the fourth circumferential width differing from the first, second and third circumferential widths.

2. The saw blade of claim 1 wherein the groups are sequentially arranged along the outer edge of the blade; and wherein the first circumferential width is smaller than the second circumferential width which is smaller than the third circumferential width which is smaller than the fourth circumferential width.

3. The saw blade of claim 2 wherein the number of cutting edges in the first group is greater than the number of cutting edges in the second group, which is greater than the number of cutting edges in the third group, which is greater than the number of cutting edges in the fourth group.

4. The saw blade of claim 2 wherein the first group includes a first cutting edge and a last cutting edge defining therebetween a first group circumferential width; wherein the second group includes a first cutting edge and a last cutting edge defining therebetween a second group circumferential width; wherein the third group includes a first cutting edge and a last cutting edge defining therebetween a third group circumferential width; wherein the fourth group includes a first cutting edge and a last cutting edge defining therebetween a fourth group circumferential width; and wherein each group circumferential width is different from each other group circumferential width.

5. The saw blade of claim 1 wherein at least one circumferential space is provided between at least one of the first and second groups, the second and third groups, the third and fourth groups, and the fourth and first groups.

6. The saw blade of claim 1 wherein at least two circumferential spaces are provided respectively between at least two of the first and second groups, the second and third groups, the third and fourth groups, and the fourth and first groups; and wherein the circumferential spaces are of differing circumferential widths.

7. The saw blade of claim 1 wherein the disc is divided into a first half and a second half with the first, second, third and fourth groups of cutting edges all being within the first half and defined as a first set, and the second half including a second set that is a copy exact of the first set positioned in a diametrically opposite manner.

8. The saw blade of claim 1 wherein the first group includes seven cutting edges, the second group includes six cutting edges, the third group includes three cutting edges, and the fourth group includes two cutting edges.

9. The saw blade of claim 8 wherein the groups are sequentially arranged along the outer edge of the blade.

10. The saw blade of claim 8 wherein the first group includes a first cutting edge and a last cutting edge defining therebetween a first group circumferential width of approximately thirty-six degrees; the second group includes a first cutting edge and a last cutting edge defining therebetween a second group circumferential width of approximately forty-five degrees; the third group includes a first cutting edge and a last cutting edge defining therebetween a third group circumferential width of approximately thirty degrees; and the fourth group includes a first cutting edge and a last cutting edge defining therebetween a fourth group circumferential width of approximately twenty degrees.

11. The saw blade of claim 10 wherein the disc is divided into a first half and a second half with the first, second, third and fourth groups of cutting edges all being within the first half and defined as a first set, and the second half including a second set that is a copy exact of the first set positioned in a diametrically opposite manner.

12. The saw blade of claim 11 wherein between the first and second groups in both sets there is a first circumferential space of an approximately nine-degree circumferential width; between the second and third groups in both sets there is a second circumferential space of an approximately ten-degree circumferential width; between the third and fourth groups in both sets there is a third circumferential space of an approximately ten-degree circumferential width; and between the fourth group in each set and the first group in the respective other set there is a fourth circumferential space of an approximately twenty-degree circumferential width.

13. The saw blade of claim 1 wherein three circumferential spaces are provided respectively between at least three of the first and second groups, the second and third groups, the third and fourth groups, and the fourth and first groups; and wherein the circumferential spaces are of differing circumferential widths.

14. The saw blade of claim 13 wherein the disc is divided into a first half and a second half with the first, second, third and fourth groups of cutting edges all being within the first half and defined as a first set, and the second half including a second set that is a copy exact of the first set positioned in a diametrically opposite manner.

15. The saw blade of claim 1 wherein the fourth group has a plurality of cutting edges.

16. The saw blade of claim 1 wherein for each of the groups, the teeth within that group are substantially identical to one another; and wherein the teeth in each group is different from the teeth in each other group.

17. The saw blade of claim 1 wherein the number of cutting edges in each group is different from the number of cutting edges in each other group.

18. The saw blade of claim 17 wherein the groups are sequentially arranged along the outer edge of the blade; and wherein the number of cutting edges in the first group is greater than the number of cutting edges in the second group, which is greater than the number of cutting edges in the third group, which is greater than the number of cutting edges in the fourth group.

19. The saw blade of claim 1 wherein the first group includes a first cutting edge and a last cutting edge defining therebetween a first group circumferential width; wherein the second group includes a first cutting edge and a last cutting edge defining therebetween a second group circumferential width; wherein the third group includes a first cutting edge and a last cutting edge defining therebetween a third group circumferential width; the fourth group has a single cutting edge and defines a fourth group circumferential width between the single cutting edge in the fourth group and the adjacent cutting edge in the adjacent group; and wherein each group circumferential width is different from each other group circumferential width.

20. The saw blade of claim 1 wherein the blade has a center about which the center hole is formed; wherein all the cutting edges are substantially radially equidistant from the center of the blade; and wherein each cutting edge has a positive hook angle.

21. The saw blade of claim 1 wherein each tooth includes an insert defining the cutting edge thereof; wherein the blade has a center about which the center hole is formed; and wherein all the cutting edges are substantially radially equidistant from the center of the blade.

22. The saw blade of claim 21 wherein each cutting edge has a positive hook angle.

23. The saw blade of claim 1 wherein at least two of the first, second and third groups includes at least three of the cutting edges.

24. The saw blade of claim 23 wherein each of the first, second and third groups includes at least three of the cutting edges.

25. The saw blade of claim 1 wherein the at least one group which includes the at least three cutting edges includes a plurality of substantially identical teeth.

26. The saw blade of claim 25 wherein another of the first, second and third groups includes a plurality of substantially identical teeth; and wherein the teeth in the at least one group and the teeth in the another group are different from one another.

27. The saw blade of claim 25 wherein the first group includes a plurality of substantially identical teeth; wherein the second group includes a plurality of substantially identical teeth; wherein the third group includes a plurality of substantially identical teeth; and wherein the teeth in each of the first, second and third groups are different from the teeth in each of the other of the first, second and third groups.

28. A saw blade comprising:
a flat, circular disc having a peripheral outer edge and a center hole;
a plurality of circumferentially-spaced teeth each having a cutting edge and projecting radially outwardly from the peripheral outer edge;
a first group of the cutting edges defining a first circumferential width between each adjacent pair of the cutting edges in the first group;
a second group of the cutting edges defining a second circumferential width between each adjacent pair of the cutting edges in the second group; the second circumferential width differing from the first circumferential width;
a third group of the cutting edges defining a third circumferential width between each adjacent pair of the cutting edges in the third group; the third circumferential width differing from the first and second circumferential widths; and
a fourth group having at least one cutting edge defining a fourth circumferential width as one of the distance between adjacent cutting edges in the fourth group and, the distance between the at least one cutting edge in the fourth group and the adjacent cutting edge in the adjacent group; the fourth circumferential width differing from the first, second and third circumferential widths;
wherein the number of cutting edges in adjacent groups alternates from odd to even.

29. A saw blade comprising:
a flat, circular disc having a peripheral outer edge and a center hole;

a plurality of circumferentially-spaced teeth each having a cutting edge and projecting radially outwardly from the peripheral outer edge;

a first group of the cutting edges defining a first circumferential width between each adjacent pair of the cutting edges in the first group;

a second group of the cutting edges defining a second circumferential width between each adjacent pair of the cutting edges in the second group, the second circumferential width differing from the first circumferential width;

a third group of the cutting edges defining a third circumferential width between each adjacent pair of the cutting edges in the third group; the third circumferential width differing from the first and second circumferential widths; and a fourth group having at least one cutting edge defining a fourth circumferential width as one of the distance between adjacent cutting edges in the fourth group and, the distance between the at least one cutting edge in the fourth group and the adjacent cutting edge in the adjacent group; the fourth circumferential width differing from the first, second and third circumferential widths;

wherein at least four circumferential spaces are provided respectively, one between the first and second groups, one between the second and third groups, one between the third and fourth groups, and one between the fourth and first groups, and wherein each of the circumferential spaces extends between adjacent cutting edges such that there are no cutting edges within the circumferential spaces.

30. The saw blade of claim 29 wherein the disc is divided into a first half and a second half with the first, second, third and fourth groups of cutting edges all being within the first half and defined as a first set, and the second half including a second set that is a copy exact of the first set positioned in a diametrically opposite manner.

31. The saw blade of claim 29 wherein the first group includes a first cutting edge and a last cutting edge defining therebetween a first group circumferential width; wherein the second group includes a first cutting edge and a last cutting edge defining therebetween a second group circumferential width; wherein the third group includes a first cutting edge and a last cutting edge defining therebetween a third group circumferential width; wherein the fourth group includes a first cutting edge and a last cutting edge defining therebetween a fourth group circumferential width; and wherein each group circumferential width is greater than or equal to each circumferential space.

32. A saw blade comprising:

a flat, circular disc having a peripheral outer edge and a center hole, the disc being divided into a first half and a second half, each half being a copy exact of the other half positioned in a diametrically opposite manner;

a plurality of circumferentially-spaced teeth each having a cutting edge and projecting radially outwardly from the peripheral outer edge;

a first group in each half having seven cutting edges including a first cutting edge and a last cutting edge defining a first group circumferential width therebetween which is approximately thirty-six degrees;

a second group in each half having six cutting edges including a first cutting edge and a last cutting edge defining a second group circumferential width therebetween which is approximately forty-five degrees;

a third group in each half having three cutting edges including a first cutting edge and a last cutting edge defining a second group circumferential width therebetween which is approximately thirty degrees;

a fourth group in each half having two cutting edges defining a second group circumferential width therebetween which is approximately twenty degrees;

a first circumferential space being between the first and second groups in each half and having an approximately nine-degree circumferential width;

a second circumferential space being between the second and third groups in each half and having an approximately ten-degree circumferential width;

a third circumferential space being between the third and fourth groups in each half and having an approximately ten-degree circumferential width; and a fourth circumferential space being between the fourth group in each half and the first group in the respective other half and having an approximately twenty-degree circumferential width.

33. The saw blade of claim 32 wherein the blade has a center about which the center hole is formed; wherein all the cutting edges are substantially radially equidistant from the center of the blade; and wherein each cutting edge has a positive hook angle.

34. The saw blade of claim 32 wherein each tooth includes an insert defining the cutting edge thereof; wherein the blade has a center about which the center hole is formed; and wherein all the cutting edges are substantially radially equidistant from the center of the blade.

* * * * *